United States Patent
Furukawa

(10) Patent No.: US 10,500,834 B2
(45) Date of Patent: Dec. 10, 2019

(54) THREE-DIMENSIONAL LAMINATING AND SHAPING APPARATUS, CONTROL METHOD OF THREE-DIMENSIONAL LAMINATING AND SHAPING APPARATUS, AND CONTROL PROGRAM OF THREE-DIMENSIONAL LAMINATING AND SHAPING APPARATUS

(71) Applicant: TECHNOLOGY RESEARCH ASSOCIATION FOR FUTURE ADDITIVE MANUFACTURING, Tokyo (JP)

(72) Inventor: Tetsuyoshi Furukawa, Amagasaki (JP)

(73) Assignee: TECHNOLOGY RESEARCH ASSOCIATION FOR FUTURE ADDITIVE MANUFACTURING, Tokyo (JP)

(*) Notice: Subject to any disclaimer, the term of this patent is extended or adjusted under 35 U.S.C. 154(b) by 420 days.

(21) Appl. No.: 15/117,657

(22) PCT Filed: Nov. 13, 2015

(86) PCT No.: PCT/JP2015/081972
§ 371 (c)(1),
(2) Date: Aug. 9, 2016

(87) PCT Pub. No.: WO2017/081814
PCT Pub. Date: May 18, 2017

(65) Prior Publication Data
US 2017/0266878 A1    Sep. 21, 2017

(51) Int. Cl.
*G06F 19/00* (2018.01)
*B33Y 50/02* (2015.01)
(Continued)

(52) U.S. Cl.
CPC ............. *B33Y 50/02* (2014.12); *B22F 3/105* (2013.01); *B22F 3/1055* (2013.01); *B22F 3/16* (2013.01);
(Continued)

(58) Field of Classification Search
CPC .......... B33Y 10/00; B33Y 30/00; B33Y 50/00
(Continued)

(56) References Cited

U.S. PATENT DOCUMENTS 9,162,393 B2   10/2015 Ackelid
9,162,394 B2   10/2015 Ackelid
(Continued)

FOREIGN PATENT DOCUMENTS

EP    2 921 285 A1   9/2015
EP    2 937 163 A1   10/2015
(Continued)

OTHER PUBLICATIONS

Supplementary European Search Report (SESR) dated Apr. 12, 2018 mailed in connection with corresponding European Patent Application No. EP 15 89 9120.8.
(Continued)

*Primary Examiner* — Md Azad
(74) *Attorney, Agent, or Firm* — Ladas & Parry LLP

(57) ABSTRACT

The cost required to shape a three-dimensional laminated and shaped object is suppressed. A three-dimensional laminating and shaping apparatus for shaping a three-dimensional laminated and shaped object by irradiating a powder with a high-energy beam includes a laminating and shaping data acquirer that acquires laminating and shaping data to be used for laminating and shaping of the three-dimensional laminated and shaped object, an attribute information acquirer that acquires attribute information of the powder to be used for laminating and shaping of the three-dimensional
(Continued)

laminated and shaped object, a model generator that generates, based on the laminating and shaping data and the attribute information, a circuit pattern model for removing electrons from the powder electrically charged by irradiation with the high-energy beam, and a circuit pattern shaping unit that shapes a circuit pattern based on the generated circuit pattern model.

9 Claims, 10 Drawing Sheets

(51) Int. Cl.
```
B22F 3/105      (2006.01)
B22F 3/16       (2006.01)
B29C 67/00      (2017.01)
B33Y 10/00      (2015.01)
B33Y 30/00      (2015.01)
B33Y 50/00      (2015.01)
B29C 64/141     (2017.01)
B29C 64/386     (2017.01)
```

(52) U.S. Cl.
CPC .......... *B29C 64/141* (2017.08); *B29C 64/386* (2017.08); *B29C 67/00* (2013.01); *B33Y 10/00* (2014.12); *B33Y 30/00* (2014.12); *B33Y 50/00* (2014.12); *B22F 2003/1057* (2013.01); *Y02P 10/295* (2015.11)

(58) Field of Classification Search
USPC ........................................................ 700/118
See application file for complete search history.

(56) References Cited

U.S. PATENT DOCUMENTS

| | | | |
|---|---|---|---|
| 2008/0067441 A1 | 3/2008 | Wake et al. | |
| 2010/0125356 A1* | 5/2010 | Shkolnik ................... | G06T 1/00 |
| | | | 700/98 |
| 2010/0163405 A1 | 7/2010 | Ackelid | |
| 2015/0209907 A1 | 7/2015 | Narayanan et al. | |
| 2015/0270089 A1 | 9/2015 | Ghanea-Hercock | |
| 2015/0273622 A1* | 10/2015 | Manabe ............. | B23K 15/0086 |
| | | | 219/76.1 |
| 2015/0306700 A1 | 10/2015 | Honda | |
| 2016/0027611 A1 | 1/2016 | Ookawa et al. | |
| 2016/0271696 A1* | 9/2016 | Kamakura ............ | B22F 3/1055 |
| 2017/0304894 A1* | 10/2017 | Buller ..................... | B22F 3/105 |
| 2017/0345610 A1 | 11/2017 | Ghanea-Hercock | |
| 2018/0071987 A1* | 3/2018 | Tsumuraya ............. | B22F 3/105 |

FOREIGN PATENT DOCUMENTS

| | | |
|---|---|---|
| EP | 2 978 010 A1 | 1/2016 |
| JP | 2010-526694 A | 8/2010 |
| JP | 2015-175012 A | 10/2015 |
| JP | 2015-193883 A | 11/2015 |
| WO | 2008-147306 A1 | 12/2008 |
| WO | 2014/148096 A1 | 9/2014 |

OTHER PUBLICATIONS

International Search Report (ISR) dated Feb. 3, 2016 for International Application No. PCT/JP2015/081972.
J-PlatPat English abstract of JP 2015-193883 A.
J-PlatPat English abstract of JP 2015-175012 A.

* cited by examiner

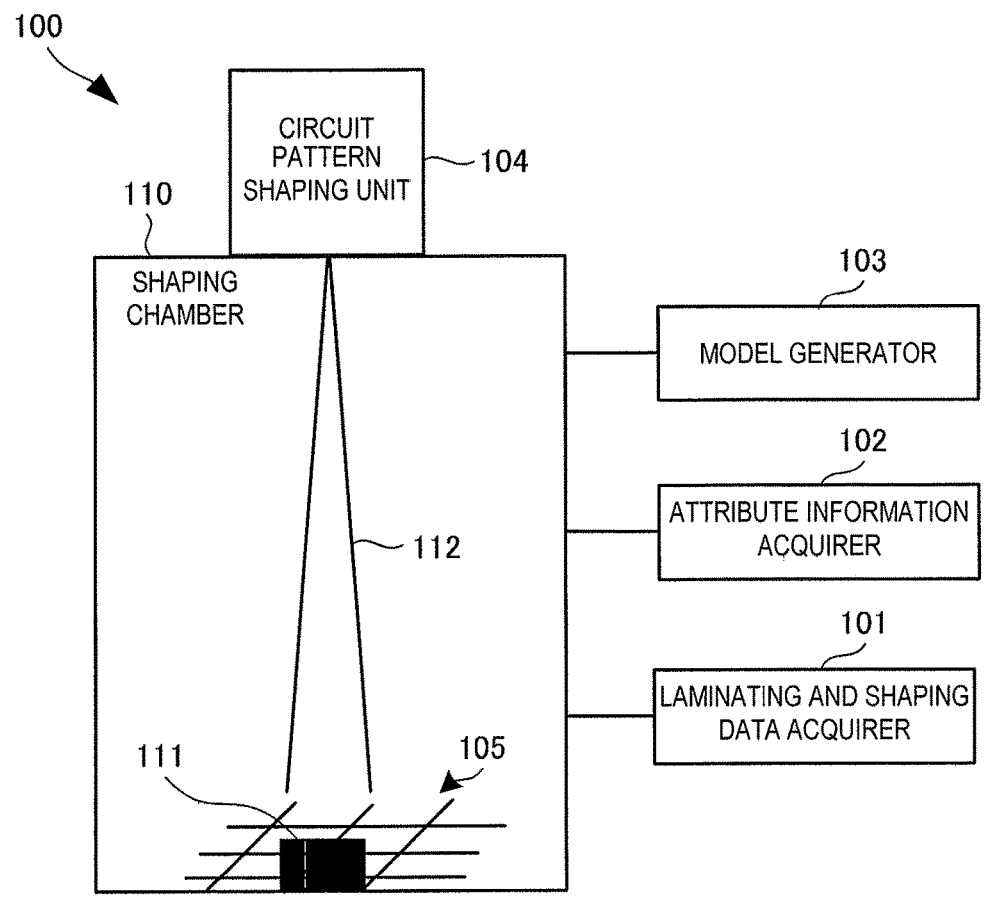
F I G. 1

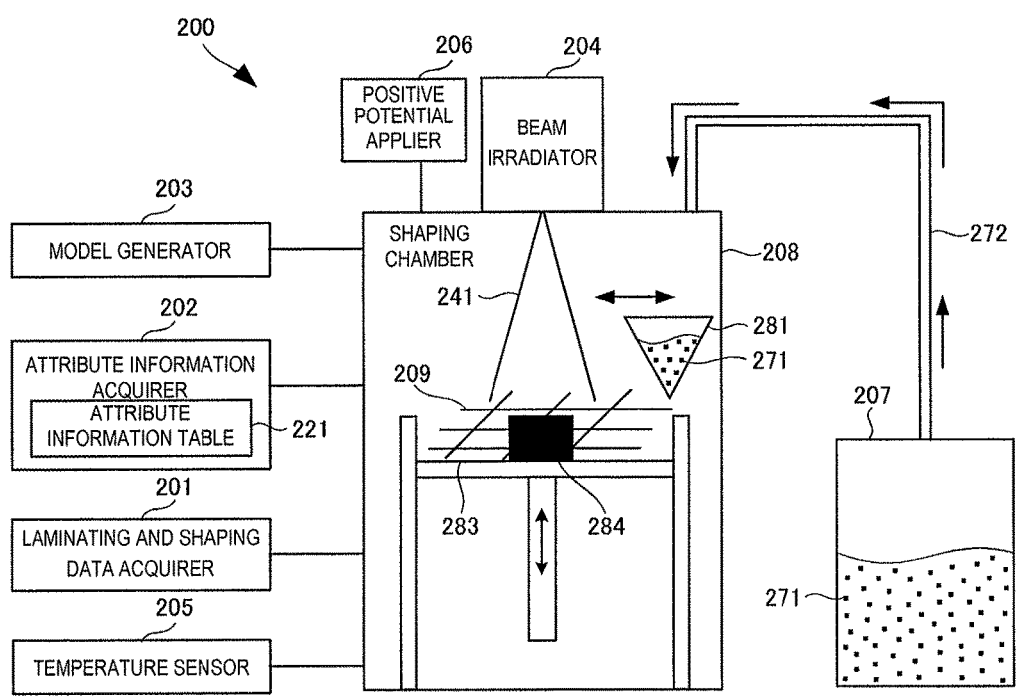
F I G. 2

221

| POWDER ID | CONDUCTIVENESS | PARTICLE SIZE | ELECTRIC FIELD STRENGTH | RESISTANCE VALUE | ... |
|---|---|---|---|---|---|
| A0001 | | | | | |
| A0002 | | | | | |
| ⋮ | ⋮ | ⋮ | ⋮ | ⋮ | ⋮ |
| B0001 | | | | | |
| ⋮ | ⋮ | ⋮ | ⋮ | ⋮ | ⋮ |

F I G. 3

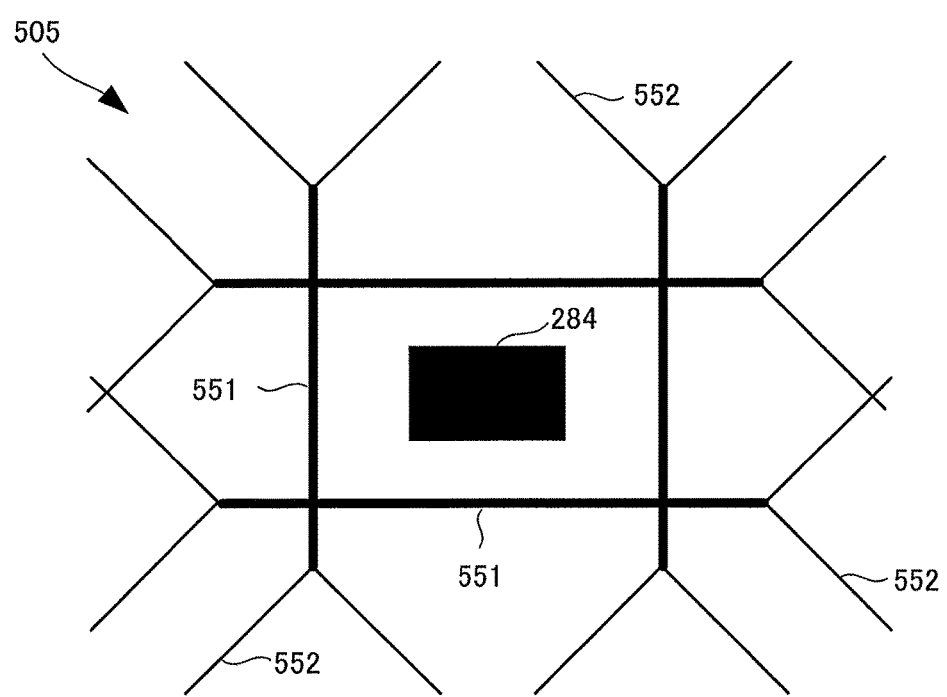
F I G. 5E

THREE-DIMENSIONAL LAMINATING AND SHAPING APPARATUS, CONTROL METHOD OF THREE-DIMENSIONAL LAMINATING AND SHAPING APPARATUS, AND CONTROL PROGRAM OF THREE-DIMENSIONAL LAMINATING AND SHAPING APPARATUS

RELATED APPLICATION

This application is an application under 35 U.S.C. 371 of International Application No. PCT/JP2015/081972 filed on Nov. 13, 2015, the entire contents of which are incorporated herein by reference.

TECHNICAL FIELD

The present invention relates to a three-dimensional laminating and shaping apparatus, a control method of the three-dimensional laminating and shaping apparatus, and a control program of the three-dimensional laminating and shaping apparatus.

BACKGROUND ART

In the above technical field, patent literature 1 discloses a technique of introducing an inert gas to a shaping chamber.

CITATION LIST

Patent Literature

Patent literature 1: Japanese PCT National Publication No. 2010-526694

SUMMARY OF THE INVENTION

Technical Problem

The technique described in the above literature prevents a powder from being electrically charged by introducing the inert gas to the shaping chamber. If, however, the capacity of the shaping chamber is large, a large amount of inert gas is necessary, and it is thus impossible to suppress the cost required to shape a three-dimensional laminated and shaped object.

The present invention enables to provide a technique of solving the above-described problem.

Solution to Problem

One aspect of the present invention provides a three-dimensional laminating and shaping apparatus for shaping a three-dimensional laminated and shaped object by irradiating a powder with a high-energy beam, comprising:

a laminating and shaping data acquirer that acquires laminating and shaping data to be used for laminating and shaping of the three-dimensional laminated and shaped object;

an attribute information acquirer that acquires attribute information of the powder to be used for laminating and shaping of the three-dimensional laminated and shaped object;

a model generator that generates, based on the laminating and shaping data and the attribute information, a circuit pattern model for removing electrons from the powder electrically charged by irradiation with the high-energy beam; and a circuit pattern shaping unit that shapes a circuit pattern based on the generated circuit pattern model.

Another aspect of the present invention provides a control method of a three-dimensional laminating and shaping apparatus for shaping a three-dimensional laminated and shaped object by irradiating a powder with a high-energy beam, comprising:

acquiring laminating and shaping data to be used for laminating and shaping of the three-dimensional laminated and shaped object;

acquiring attribute information of the powder to be used for laminating and shaping of the three-dimensional laminated and shaped object;

generating, based on the laminating and shaping data and the attribute information, a circuit pattern model for removing electrons from the powder electrically charged by irradiation with the high-energy beam; and shaping a circuit pattern based on the generated circuit pattern model.

Still other aspect of the present invention provides a control program of a three-dimensional laminating and shaping apparatus for shaping a three-dimensional laminated and shaped object by irradiating a powder with a high-energy beam, the program for causing a computer to execute a method, comprising:

acquiring laminating and shaping data to be used for laminating and shaping of the three-dimensional laminated and shaped object;

acquiring attribute information of the powder to be used for laminating and shaping of the three-dimensional laminated and shaped object;

generating, based on the laminating and shaping data and the attribute information, a circuit pattern model for removing electrons from the powder electrically charged by irradiation with the high-energy beam; and shaping a circuit pattern based on the generated circuit pattern model.

Advantageous Effects of Invention

According to the present invention, it is possible to suppress the cost required to shape a three-dimensional laminated and shaped object.

BRIEF DESCRIPTION OF DRAWINGS

FIG. 1 is a view showing the arrangement of a three-dimensional laminating and shaping apparatus according to the first embodiment of the present invention;

FIG. 2 is a view showing the arrangement of a three-dimensional laminating and shaping apparatus according to the second embodiment of the present invention;

FIG. 3 is a table showing an example of an attribute table used by the three-dimensional laminating and shaping apparatus according to the second embodiment of the present invention;

FIG. 5E is a view showing still other modification of the circuit pattern shaped by the three-dimensional laminating and shaping apparatus according to the second embodiment of the present invention.

DESCRIPTION OF THE EMBODIMENTS

Figure 4:
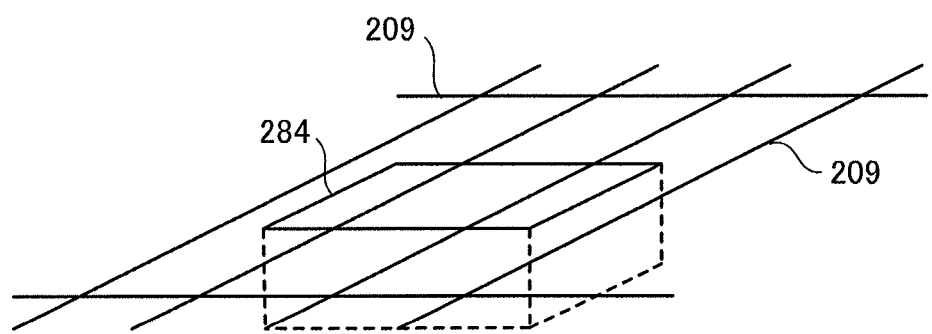
FIG. 4 is a perspective view for explaining an example of a circuit pattern shaped by the three-dimensional laminating and shaping apparatus according to the second embodiment of the present invention.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

A three-dimensional laminating and shaping apparatus 100 as the first embodiment of the present invention will be described with reference to FIG. 1. The three-dimensional laminating and shaping apparatus 100 is an apparatus for shaping a three-dimensional laminated and shaped object 111 by irradiating a powder with a high-energy beam 112. As shown in FIG. 1, the three-dimensional laminating and shaping apparatus 100 includes a laminating and shaping data acquirer 101, an attribute information acquirer 102, a model generator 103, and a circuit pattern shaping unit 104. The three-dimensional laminating and shaping apparatus 100 also includes a shaping chamber 110.

The laminating and shaping data acquirer 101 acquires laminating and shaping data to be used for laminating and shaping of the three-dimensional laminated and shaped object 111. The attribute information acquirer 102 acquires attribute information of a powder to be used for laminating and shaping of the three-dimensional laminated and shaped object 111. Based on the laminating and shaping data and the attribute information, the model generator 103 generates a circuit pattern model for removing electrons from the powder electrically charged by irradiation with the high-energy beam 112. The circuit pattern shaping unit 104 shapes a circuit pattern based on the generated circuit pattern model.

According to this embodiment, since charges in the electrically charged powder are removed, it is possible to suppress the cost required to shape the three-dimensional laminated and shaped object.

Second Embodiment

A three-dimensional laminating and shaping apparatus according to the second embodiment of the present invention will be described with reference to FIG. 2. FIG. 2 is a view for explaining the arrangement of a three-dimensional laminating and shaping apparatus 200 according to this embodiment. The three-dimensional laminating and shaping apparatus 200 includes a laminating and shaping data acquirer 201, an attribute information acquirer 202, a model generator 203, a beam irradiator 204, a temperature sensor 205, a positive potential applier 206, a powder tank 207, and a shaping chamber 208.

The three-dimensional laminating and shaping apparatus 200 is an apparatus for shaping a three-dimensional laminated and shaped object 284 on a work 283 in the shaping chamber 208 by irradiating a powder 271 with a beam 241. The powder 271 is conveyed from the powder tank 207 to a recoater 281 in the shaping chamber 208. The recoater 281 spreads, on the work 283, the powder 271 conveyed from the powder tank 207 while moving in the shaping chamber 208 in the back-and-forth direction and right-and-left direction. The three-dimensional laminating and shaping apparatus 200 irradiates, with the beam 241 from the beam irradiator 204, the powder 271 spread on the work 283. The powder 271 irradiated with the beam 241 melts. The melted powder 271 is cooled and hardened to finally shape the three-dimensional laminated and shaped object 284.

The laminating and shaping data acquirer 201 acquires laminating and shaping data to be used by the three-dimensional laminating and shaping apparatus 200 to shape the three-dimensional laminated and shaped object 284. Based on the laminating and shaping data, the three-dimensional laminating and shaping apparatus 200 shapes the three-dimensional laminated and shaped object 284 by irradiating the powder 271 spread on the work 283 with the beam 241 while performing a scan.

The attribute information acquirer 202 acquires the attributes of the powder 271. The attributes of the powder 271 include, for example, the type, conductiveness (conductivity), particle size, electric field strength, and resistance value (resistivity) of the powder 271, but are not limited to them. The attribute information acquirer 202 may acquire the attribute information of the powder 271 by referring to an attribute information table 221. However, an attribute information acquisition method is not limited to this. For example, a sensor capable of acquiring the attribute information of the powder 271 or the like may be provided to directly acquire the information from the powder 271.

The powder 271 is appropriately selected in accordance with the three-dimensional laminated and shaped object 284 to be shaped. The type, particle size, and the like of the powder 271 are selected in accordance with the required durability and the application purpose of the three-dimensional laminated and shaped object 284 to be shaped. Therefore, depending on the powder 271 to be used, its characteristic is different and the chargeability, conductiveness (conductivity), resistance value (resistivity), and the like variously change. Therefore, the attribute information acquirer 202 acquires the attribute information of the powder 271. This enables the three-dimensional laminating and shaping apparatus 200 to acquire the attributes of the powder 271 to be used.

Based on the laminating and shaping data of the three-dimensional laminated and shaped object 284 and the attribute information of the powder 271, the model generator 203 generates a circuit pattern model for shaping an electric circuit for removing charges in the electrically charged powder 271. The powder 271 is charged up by the high-energy beam 241 emitted from the beam irradiator 204. Charge-up generally indicates a phenomenon in which a target irradiated with an electron beam is electrically charged to generate an electric field, and thus a beam irradiation pattern is distorted and the powder particles repel each other by their charges to scatter. When the powder 271 is electrically charged, if particles of the powder 271 come close to each other, they repel each other by accumulated charges to scatter.

If the powder 271 is electrically charged to accumulate charges, the charges accumulated in the powder 271 change the distribution of the electric field around the powder 271, and the path, output strength, and the like of the beam 241 accordingly change. For example, a change in distribution of the electric field around the powder 271 causes the beam 241 to pass through a route deviated from an original route, thereby making it impossible to irradiate a desired position with the beam 241. That is, since the control accuracy of the beam 241 lowers, the shaping accuracy of the three-dimensional laminated and shaped object 284 accordingly lowers. If the output strength of the beam 241 changes, the powder 271 may not melt, and melting unevenness may occur. Thus, similarly, the shaping accuracy of the three-dimensional laminated and shaped object 284 lowers.

It is necessary to remove charges from the powder 271, that is, it is necessary to neutralize the powder 271 so that the electric charge amount of the powder 271 becomes that which does not scatter the powder 271 or influence the path of the beam 241. With respect to the neutralization amount in this case, it is necessary to neutralize the powder 271 until the electric charge amount of the powder 271 becomes smaller than a charge value which does not cause particles of the powder 271 to repel each other or does not change the path of the beam 241, that is, a critical value.

Based on a calculation result of the electric field strength or the like, a simulation associated with a neutralization effect, and the like, the model generator 203 generates, as a circuit pattern model, a model of a circuit pattern 209 which can remove charges accumulated in the charged-up powder 271. For example, the generated circuit pattern model is represented by a circuit pattern model in which the electric field strength of the powder 271 is smaller than a critical value, but is not limited to this.

The electric charge amount of the powder 271 can be predicted based on the attributes of the powder 271 and the output (energy) of the beam 241 to be emitted. Therefore, for example, the model generator 203 may generate a circuit pattern model in accordance with the output of the beam 241 to be emitted.

The beam irradiator 204 controls the beam 241 based on the generated circuit pattern model to shape the circuit pattern 209 as an electric circuit in the shaping chamber 208.

The temperature sensor 205 is a sensor for measuring the temperature in the shaping chamber 208. In addition to the temperature of the shaping chamber 208, the temperature sensor 205 measures the temperature of the powder 271, that of the three-dimensional laminated and shaped object 284, that of a position irradiated with the beam 241, and the like. Furthermore, the temperature sensor 205 may measure the temperature in real time or at predetermined time intervals.

For example, during shaping of the three-dimensional laminated and shaped object 284, the model generator 203 may generate a circuit pattern model based on the temperature information of the powder 271 measured by the temperature sensor 205. To the contrary, the model generator 203 need not generate a circuit pattern model based on the temperature information. That is, the model generator 203 generates a circuit pattern model different from the initially generated one during shaping of the three-dimensional laminated and shaped object 284, thereby changing the circuit pattern model. That is, if the temperature of the powder 271 rises along with a rise in the temperature of the shaping chamber 208, the conductivity, the resistivity, and the like of the powder 271 also change. In this case, in the initially generated circuit pattern model, the neutralization effect of the powder 271 may deteriorate. Thus, it is preferable to change the circuit pattern model during shaping of the three-dimensional laminated and shaped object 284, and shape the circuit pattern 209 based on the changed circuit pattern model. More specifically, changing the circuit pattern model includes changing the circuit pattern 209 itself, changing the density of lead wires (electric wires) as electric paths forming the circuit pattern 209, changing the thickness of each lead wire, changing branching of each lead wire, and changing the interval (pitch) between the lead wires. However, changing the circuit pattern model is not limited to them.

Note that if the shaping processing speed decreases by changing the circuit pattern model, the circuit pattern model need not be changed, and whether to change the circuit pattern model is appropriately selected by the user of the three-dimensional laminating and shaping apparatus 200.

The positive potential applier 206 applies a positive potential to the shaped circuit pattern 209. The positive potential applier 206 may apply a ground potential to the shaped circuit pattern 209. Since the powder 271 is negatively charged, if a positive potential is applied to the circuit pattern 209, the positive potential pulls negative charges, thereby further improving the neutralization effect by the shaped circuit pattern 209. Note that a positive potential need not always be applied to the circuit pattern 209, and may be applied to a base plate.

Furthermore, instead of applying a positive potential, an electrode may be arranged on the work 283, and connected to the circuit pattern 209. Alternatively, an electrode may be arranged on the base plate and connected to the circuit pattern 209.

FIG. 3 is a table showing the structure of the attribute information table 221 included in the attribute information acquirer 202 of the three-dimensional laminating and shaping apparatus 200. The attribute information table 221 stores conductiveness 302, a particle size 303, an electric field strength 304, and a resistance value 305 in association with a powder ID (identifier) 301. Note that items stored in the attribute information table 221 are not limited to them. The attribute information acquirer 202 acquires the attribute information of the powder 271 by referring to the attribute information table 221.

FIG. 4 is a perspective view for explaining an example of the circuit pattern 209 shaped by the three-dimensional laminating and shaping apparatus 200. As shown in FIG. 4, some of the lead wires forming the circuit pattern 209 are connected to the three-dimensional laminated and shaped object 284 and some are not connected to the three-dimensional laminated and shaped object 284 at all. The circuit pattern 209 is grounded via the three-dimensional laminated and shaped object 284. As described above, the circuit pattern 209 may be grounded via the three-dimensional laminated and shaped object 284. If the circuit pattern 209 is grounded using the lead wire connected to the three-dimensional laminated and shaped object 284, one end of the lead wire, which is not connected to the three-dimensional laminated and shaped object 284, is grounded.

With respect to the lead wire which is not connected to the three-dimensional laminated and shaped object 284, one end may be connected to the base plate or the like to be grounded. Note that the circuit pattern 209 may or may not be grounded. However, if the circuit pattern 209 is grounded, it is possible to more reliably remove the charges accumulated in the powder 271. For example, if the powder 271 contacts the circuit pattern 209, the charges accumulated in the electrically charged powder 271 flow through the circuit pattern 209, and thus decrease. This can prevent the charged-up powder 271 from scattering or the route of the beam 241 from changing.

Figure 5A:
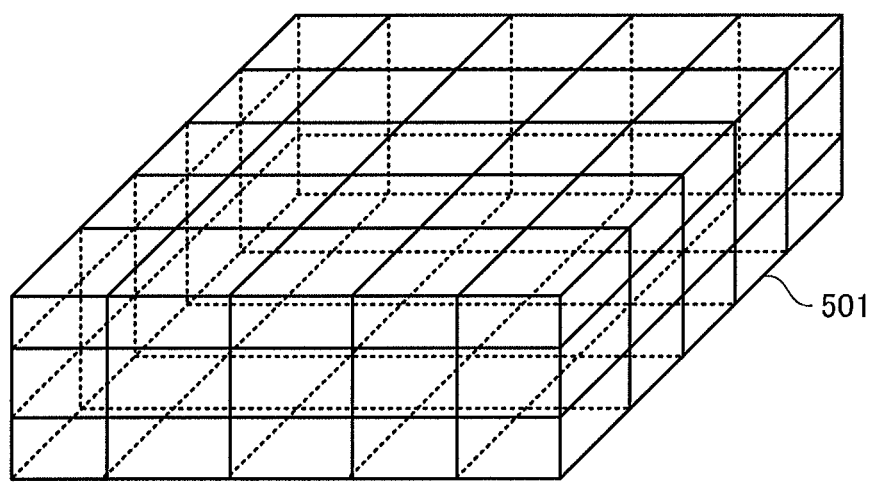
FIG. 5A is a perspective view showing a modification of the circuit pattern shaped by the three-dimensional laminating and shaping apparatus according to the second embodiment of the present invention.

FIGS. 5A to 5E are a perspective view and plan views each showing a modification of the circuit pattern shaped by the three-dimensional laminating and shaping apparatus 200. As shown in FIG. 5A, a circuit pattern 501 has a grid-like shape, and is arranged to wrap the three-dimensional laminated and shaped object 284 (not shown) in a central portion. Note that the circuit pattern is preferably designed so there is no particle of the powder 271 which is too far from the circuit pattern or the lead wires forming it. That is, if the distance between the particle of the powder 271 and the circuit pattern or lead wire is too long, and the particle is far, the charges accumulated in the electrically charged powder 271 are difficult to flow.

Figure 5B:
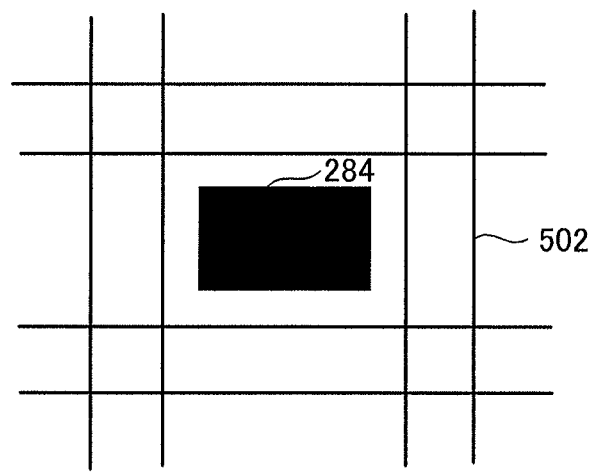
FIG. 5B is a view showing another modification of the circuit pattern shaped by the three-dimensional laminating and shaping apparatus according to the second embodiment of the present invention.

As shown in FIG. 5B, in a circuit pattern 502, circuit lead wires (electric paths) forming the circuit pattern 502 are spread around the three-dimensional laminated and shaped object 284, and the circuit pattern 502 and the three-dimensional laminated and shaped object 284 are not in contact with each other. For example, it is preferable to use a circuit pattern whose formation density is relatively low, like the circuit pattern 502, for the powder 271 having high conductiveness.

Figure 5C:
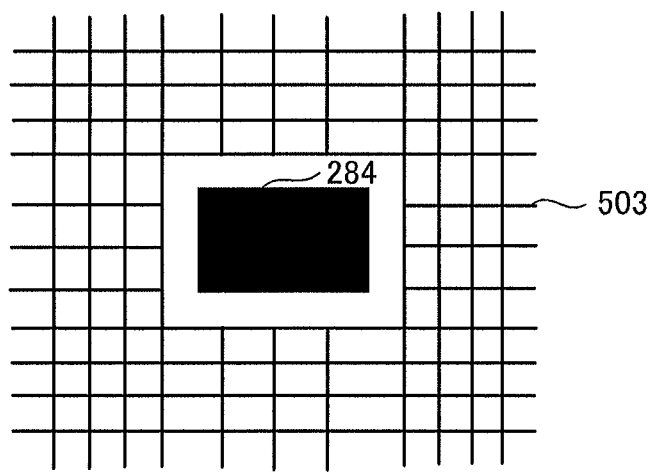
FIG. 5C is a view showing still other modification of the circuit pattern shaped by the three-dimensional laminating and shaping apparatus according to the second embodiment of the present invention.

As shown in FIG. 5C, the formation density of a circuit pattern 503 is higher than that of the circuit pattern 502. That is, in the circuit pattern 503, the pitch between lead wires forming the circuit pattern 503 and the number of lead wires are large, as compared with the circuit pattern 502. The possibility that the powder 271 contacts the circuit pattern 503 increases. For example, it is preferable to use a circuit pattern whose formation density is relatively high, like the circuit pattern 503, for the powder 271 having low conductiveness. The density of the circuit pattern to be shaped is changed in accordance with the conductiveness, the temperature, and the like of the powder 271 to be used.

Figure 5D:
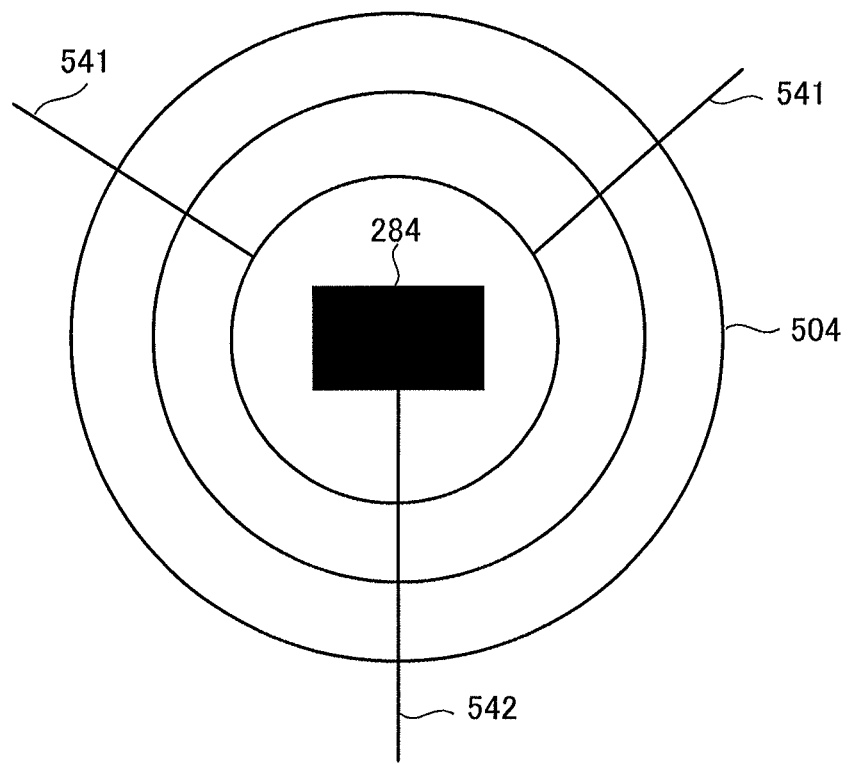
FIG. 5D is a view showing still other modification of the circuit pattern shaped by the three-dimensional laminating and shaping apparatus according to the second embodiment of the present invention.

As shown in FIG. 5D, a circuit pattern 504 is a circuit formed by a plurality of concentric circles. In the circuit pattern 504, lead wires 541 for grounding respective lead wires are provided. The lead wires 541 are not connected to the three-dimensional laminated and shaped object 284 but a lead wire 542 is connected to the three-dimensional laminated and shaped object 284. All of the lead wires 541 and 542 may or may not be connected to the three-dimensional laminated and shaped object 284.

As shown in FIG. 5E, two types of lead wires 551 and 552 are provided in a circuit pattern 505. The lead wires 551 are arranged around the three-dimensional laminated and shaped object 284, and provided so that the lead wires 552 branch from the two ends of each lead wire 551. The lead wires 551 are thicker than the lead wires 552, and the circuit pattern 505 is grounded by the lead wires 552.

Note that the shape of the circuit pattern is not limited to the above ones. Any shape which can remove the charges from the electrically charged powder 271 may be adopted.

Figure 6:
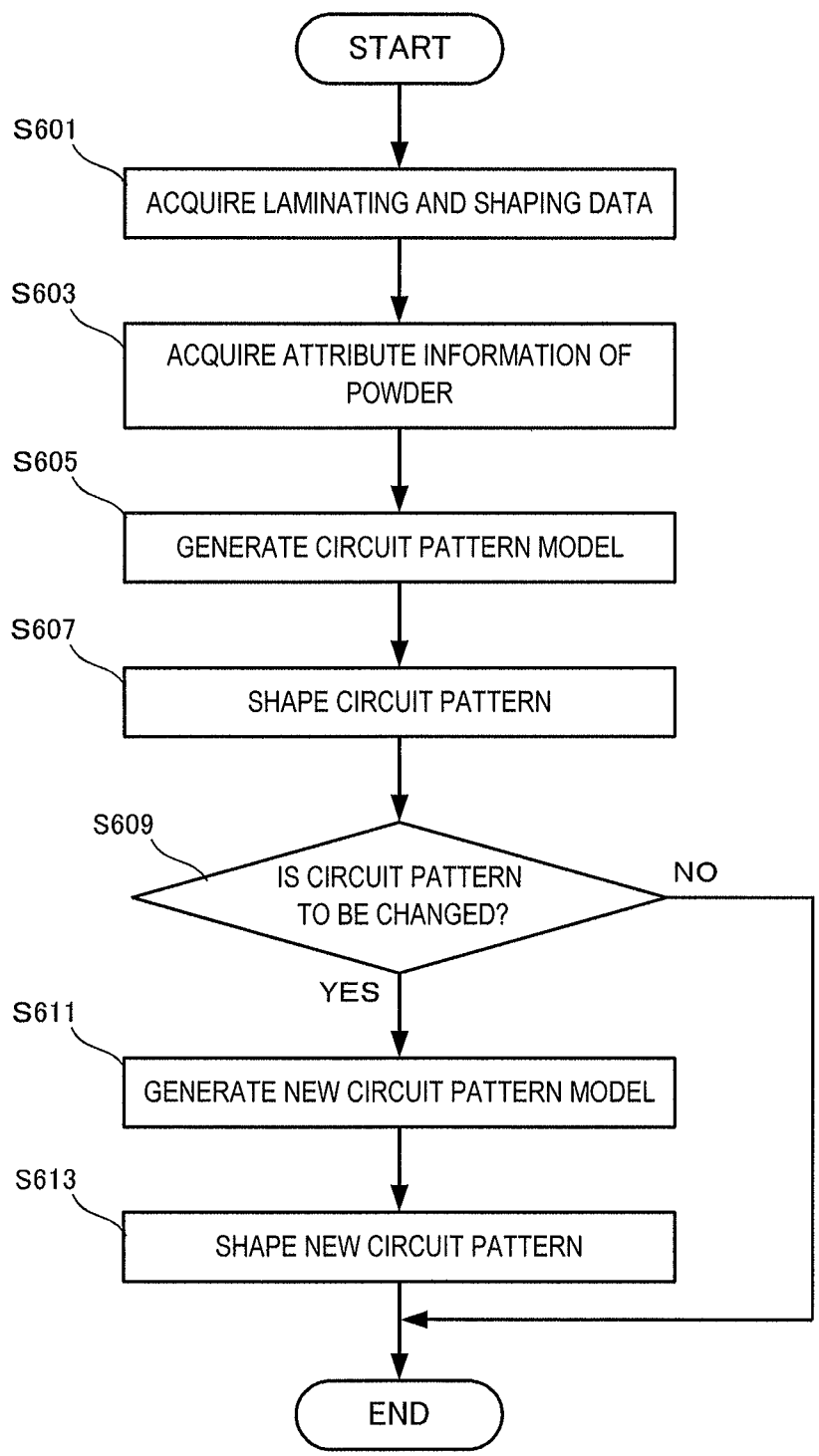
FIG. 6 is a flowchart for explaining the processing procedure of the three-dimensional laminating and shaping apparatus according to the second embodiment of the present invention.

FIG. 6 is a flowchart for explaining the processing procedure of the three-dimensional laminating and shaping apparatus 200. In step S601, the three-dimensional laminating and shaping apparatus 200 acquires laminating and shaping data used for laminating and shaping of the three-dimensional laminated and shaped object 284. In step S603, the three-dimensional laminating and shaping apparatus 200 acquires the attribute information of the powder 271 to be used for laminating and shaping of the three-dimensional laminated and shaped object 284. The attribute information includes, for example, the conductiveness, particle size, resistance value, and type of the powder 271, but is not limited to them. In step S605, the three-dimensional laminating and shaping apparatus 200 generates a circuit pattern model. The circuit pattern model is generated based on the acquired laminating and shaping data and attribute information. In step S607, the three-dimensional laminating and shaping apparatus 200 controls the beam irradiator 204 and the like to shape the circuit pattern 209 based on the generated circuit pattern model.

Furthermore, in step S609, based on the temperature of the powder 271 and the like measured by the temperature sensor 205, the three-dimensional laminating and shaping apparatus 200 determines whether to change the circuit pattern 209. If the three-dimensional laminating and shaping apparatus 200 determines that it is not necessary to change the circuit pattern 209 (NO in step S609), it terminates the processing. If the three-dimensional laminating and shaping apparatus 200 determines to change the circuit pattern 209 (YES in step S609), it generates a new circuit pattern model based on the measured temperature of the powder 271 and the like in step S611. In step S613, based on the newly generated circuit pattern model, the three-dimensional laminating and shaping apparatus 200 controls the beam irradiator 204 and the like to shape a new circuit pattern. Note that step S609 and the subsequent steps may be repeated a plurality of times to generate a new circuit pattern model a plurality of times, thereby shaping the new circuit pattern 209 a plurality of times.

According to this embodiment, no large amount of inert gas is necessary, and it is possible to suppress the cost required to shape a three-dimensional laminated and shaped object, and manufacture the three-dimensional laminated and shaped object at low cost. Furthermore, since it is not necessary to manage an inert gas, it is easy to use the three-dimensional laminating and shaping apparatus.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

The invention claimed is:

1. A three-dimensional laminating and shaping apparatus for shaping a three-dimensional laminated and shaped object by irradiating a powder with a high-energy beam, comprising:

a laminating and shaping data acquirer that acquires laminating and shaping data to be used for laminating and shaping of the three-dimensional laminated and shaped object; and an attribute information acquirer that acquires attribute information of the powder to be used for laminating and shaping of the three-dimensional laminated and shaped object, wherein the attribute information includes at least one of conductiveness, a particle size, and an electric field strength of the powder;

wherein the three-dimensional laminating and shaping apparatus generates, based on the laminating and shaping data and the attribute information, a model of a circuit pattern, wherein the circuit pattern removes electrons from the powder electrically charged by irradiation with the high-energy beam, wherein the circuit pattern is formed as electrical lead wires around the three-dimensional laminated and shaped object, and shapes the three-dimensional laminated and shaped object based on the laminating and shaping data with the circuit pattern based on the generated model.

2. The three-dimensional laminating and shaping apparatus according to claim 1, further comprising:

a temperature measurer that measures a temperature of the powder, wherein said three-dimensional laminating and shaping apparatus generates the circuit pattern model based on the temperature of the powder.

3. The three-dimensional laminating and shaping apparatus according to claim 2, wherein said three-dimensional laminating and shaping apparatus is configured to change at least one of the circuit pattern model and a formation density of the circuit pattern model based on a change in the temperature of the powder.

4. The three-dimensional laminating and shaping apparatus according to claim 1, wherein the high-energy beam is an electron beam.

5. The three-dimensional laminating and shaping apparatus according claim 1, wherein the circuit pattern is grounded.

6. The three-dimensional laminating and shaping apparatus according to claim 1, further comprising:

a positive potential applier that applies a positive potential to the circuit pattern.

7. The three-dimensional laminating and shaping apparatus according to claim 1, wherein the formation density is a density at which the electric field strength of the powder is smaller than a critical value.

8. A control method of a three-dimensional laminating and shaping apparatus for shaping a three-dimensional laminated and shaped object by irradiating a powder with a high-energy beam, comprising:

acquiring laminating and shaping data to be used for laminating and shaping of the three-dimensional laminated and shaped object;

acquiring attribute information of the powder to be used for laminating and shaping of the three-dimensional laminated and shaped object;

generating, based on the laminating and shaping data and the attribute information, a circuit pattern, wherein the circuit pattern removes electrons from the powder to be electrically charged by irradiation with the high-energy beam, wherein the circuit pattern is formed as electrical lead wires around the three-dimensional laminated and shaped object; and shaping the three-dimensional laminated and shaped object based on the laminating and shaping data with the circuit pattern based on the generated model and the three-dimensional laminated and shaped object based on laminating and shaping data.

9. A non-transitory computer readable medium storing a control program of a three-dimensional laminating and shaping apparatus for shaping a three-dimensional laminated and shaped object by irradiating a powder with a high-energy beam, the program for causing a computer to execute a method, comprising:

acquiring laminating and shaping data to be used for laminating and shaping of the three-dimensional laminated and shaped object;

acquiring attribute information of the powder to be used for laminating and shaping of the three-dimensional laminated and shaped object;

generating, based on the laminating and shaping data and the attribute information, a model of a circuit pattern, wherein the circuit pattern removes electrons from the powder to be electrically charged by irradiation with the high-energy beam, wherein the circuit pattern is formed as electrical lead wires around the three-dimensional laminated and shaped object; and shaping the three-dimensional laminated and shaped object based on the laminating and shaping data with the circuit pattern based on the generated model and the three-dimensional laminated and shaped object based on laminating and shaping data.

\* \* \* \* \*